United States Patent

[11] 3,573,364

[72] Inventor Tadao Shimamura
Tokyo, Japan

[21] Appl. No. 847,632
[22] Filed Aug. 5, 1969
[45] Patented Apr. 6, 1971

[73] Assignee Nippon Electric Company, Limited
Tokyo, Japan

[32] Priority Aug. 8, 1968
[33] Japan
[31] 43/55807

[54] BAND-COMPRESSED SIGNAL TRANSMISSION SYSTEM
15 Claims, 3 Drawing Figs.

[52] U.S. Cl. .......... 178/6.8, 178/6 Dig 3, 179/15.55, 325/38B
[51] Int. Cl. .......... H04n 7/12
[50] Field of Search .......... 178/6 (BWR); 179/15.55, 15 (BWR); 325/38 (B) (38.1)

[56] References Cited

UNITED STATES PATENTS

| | | | |
|---|---|---|---|
| 2,905,756 | 9/1959 | Graham .......... | 178/6 |
| 3,173,092 | 3/1965 | Meschi .......... | 325/38(B) |
| 3,384,823 | 5/1968 | Southworth .......... | 325/38(B) |
| 3,518,548 | 6/1970 | Greefkes et al. .......... | 325/38(B) |

*Primary Examiner*—Robert L. Griffin
*Assistant Examiner*—Richard K. Eckert, Jr.
*Attorney*—Marn and Jangarathis

ABSTRACT: A band-compressed delta modulated signal communication system for transmitting an information signal admitting of abrupt variations in amplitude is disclosed in accordance with the teachings of the present invention wherein delta modulating means operable at a first frequency and at a first quantizing level generates a first pulse signal representative of gradual variations in the amplitude of said information signal and pulse modulating means responsive to said delta modulating means and operable at a second frequency and at a second quantizing level generates a second pulse signal representative of abrupt variations in the amplitude of said information signal. The first and second pulse signals are transmitted to a receiving station whereat said first and second pulse signals are demodulated to derive first and second analog signals which are combined to reproduce said information signal.

INVENTOR.
Tadao Shimamura
BY
Marn & Jangarathis
ATTORNEYS

INVENTOR.
Tadao Shimamura
BY
Mann & Jangarathis
ATTORNEYS

BAND-COMPRESSED SIGNAL TRANSMISSION SYSTEM

This invention relates to a band-compressed signal transmission system and, more particularly, to a band-compression system adapted for a delta-modulated signal transmission system.

Pulse code modulation and delta modulation are recognized as being well suited for pulse transmission of television signals. Delta modulation has been found to be more economical than pulse code modulation because the modulating and demodulating means of the former are simpler and less costly to manufacture than the latter. On the other hand, however, an attendant disadvantage of delta modulation systems is the requirement of a wider transmission frequency band than that required by PCM in order to maintain the requisite transmission quality. This is attributed to the fact that a relatively high sampling frequency is necessary to accurately follow the abrupt changes in the amplitude of the signal to be modulated. An insufficient sampling frequency results in a large error signal for those amplitude components exhibiting abrupt changes, thereby frustrating the reproduction of a high-quality television picture.

The bandwidth of a television signal must be large to effectively avoid the visual perception of flicker and to provide adequate resolution to the reproduced picture. The standard television signal for commercial and industrial use occupies a bandwidth ranging from 3 MHz. to 5 MHz. If a video signal of such a wide frequency band is to be transmitted by a pulse modulation system, the frequency band should be 60 MHz. for PCM systems and 100 MHz. for delta modulation systems.

A close examination of conventional television signals and the corresponding reproduced picture reveals that the high frequency components of the television signal are primarily attributable to the boundaries of transitions between the objects and background included in an optically sensed scene. In other words, the abrupt changes in light intensity contribute to widen the bandwidth of a television signal. In order to reproduce those boundaries, at high fidelity at a receiving station, a transmission path of wide frequency bandwidth is needed.

It has been experimentally confirmed that those portions of an optical field involving abrupt light intensity changes are usually restricted to a small portion of the entire field. In other words, the probability of occurrence of a scene including an extensive number of abrupt light intensity changes is very low. It follows therefore that the conventional video transmission channel of wide bandwidth is not utilized to its full capacity, and that the video signals admit of further band compression.

On the other hand, a study of the human eye has shown that the visual discrimination of the level of light intensity of an optical scene is high when the change in the light intensity is moderate, while it is relatively low for an abrupt change in light intensity. It follows therefore that a video signal, to be processed by pulse code modulation, should be quantized by 100 or more quantization levels in a PCM system. Otherwise, it is not possible to reproduce a high quality video picture suitable for visual perception. However, one skilled in the art understands that for delta modulation transmission, the number of quantization levels may be reduced without impairing the quality of the reproduced signal. It would be a logical conclusion therefore that if the amount of video information to be transmitted can be reduced, then the necessary bandwidth may be compressed.

Therefore, it is an object of the present invention to provide a band-compression delta modulation system.

It is another object of the present invention to provide a band-compression delta modulation communication system for transmitting over a relatively narrow bandwidth communication channel an information signal exhibiting abrupt variations in amplitude.

It is a further object of the present invention to provide a pulse communication system wherein gradual variations in the amplitude of an information signal are represented by a first pulse signal transmitted to a receiver and abrupt variations in the amplitude of an information signal are represented by a second signal transmitted to a receiver.

It is yet another object of the present invention to provide a pulse communication system for the transmission of a wide band video signal to a receiving station over a relatively narrow bandwidth communication channel without deprivation of video fidelity.

Various other objects and advantages of the invention will become clear from the following detailed description of exemplary embodiments thereof, and the novel features will be particularly pointed out in connection with the appended claims.

This invention is based on the fact that the probability of occurrence of a scene having abrupt changes in the light intensity which contribute to the high frequency components of a video signal is very low and that the video signals representative of such scenes can be encoded with a smaller number of quantization levels then heretofore employed.

In the present band-compression system adapted for the delta modulation transmission of video signals, a combination of a single delta modulator exhibiting a first quantization level and a plurality of pulse modulators exhibiting individually distinct quantization levels is provided. The pulse modulators are coupled to the delta modulator so that they may be supplied at their respective input terminals with the differences between their respective quantizing signals and the input signal applied to the respective preceding pulse modulators; and that their output coded signals may be transmitted after being subjected to multiplexing, if desired. At the receiving station, the transmitted signal is separated into a plurality of pulse coded signals, which are in turn demodulated by respective demodulators associated with the separated code signals. For convenience, the demodulators employed at the receiver may be identical to the local decoders employed at the transmitter. The fundamental frequency components of the video signal components are determined from the demodulated signals by use of low pass filters. The filtered components are then summed to reproduce the original video signal.

Other objects and features of this invention will be better understood from the following description taken in conjunction with the accompanying drawings, in which.

Figure 1:
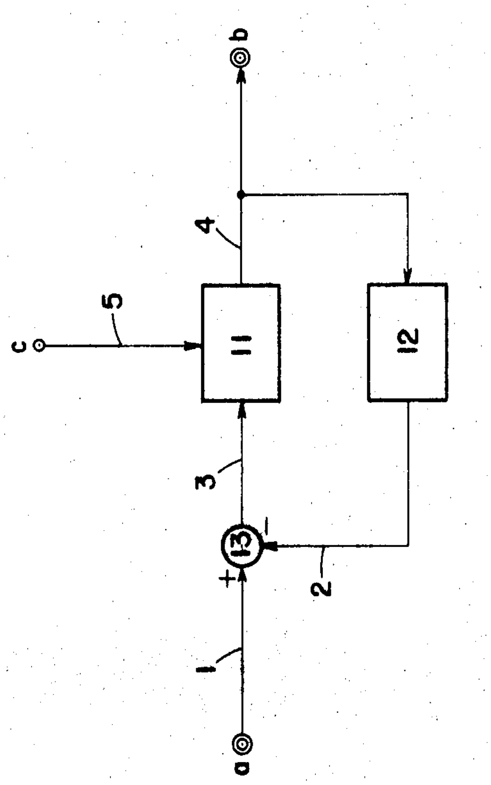
FIG. 1 is a block diagram of a conventional delta modulation system.

In the conventional delta modulator shown in FIG. 1, an input signal on lead 1 supplied from an input terminal *a* is subjected to a subtraction operation with respect to an output signal on lead 2 produced by a local decoder 12. The resultant difference signal appearing on lead 3 is applied to a 1-bit polarity coder 11, which delivers a binary output 1 and 0 to lead 4 in response to the change in the polarity of the difference signal applied thereto by lead 3. This binary output signal is applied to the local decoder 12. The decoder 12 may comprise a single integrator, a double integrator, a prediction-type double integrator, or other well-known decoding means as are conventionally employed in delta modulation systems. The delta modulation operation is controlled by sampling pulses of a suitable sampling frequency supplied from terminal *c*.

Figure 2:
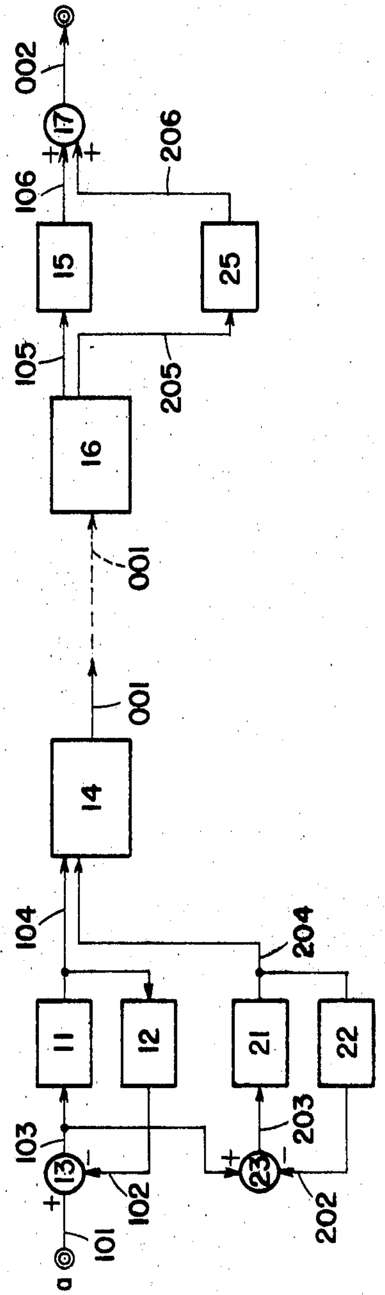
FIG. 2 shows in block form an embodiment of this invention.

Referring to FIG. 2, a plurality of delta modulators of the type shown in FIG. 1 are used. The 1-bit coder 11, local decoder 12 and subtractor 13 comprise a first delta modulator, and another 1-bit coder 21, local decoder 22 and subtractor 23 comprise a second delta modulator. Sampling pulses are supplied to these delta modulators from a sampling pulse source, not shown. The first delta modulator is supplied at input terminal *a* with the video signal to be transmitted. The second delta modulator receives the output signal of the subtractor 13 of the first delta modulator via lead 103 for further delta modulation. The sampling frequency and quantizing level associated with the first delta modulator may be equal to or different from those of the second delta modulator as will soon be seen. Preferably, the quantizing level of the first delta modulator is arranged to be small whereby the video signal applied to terminal *a* is finely quantized so that the reproduced picture is suitably perceived even when the video signal represents the smallest variation in light intensity. Also, the sampling frequency of the first delta modulation is arranged to be less than the sampling frequency heretofore required by the prior art, for example, one-half to one-fourth of the lowest possible sampling frequency that is needed to quantize the most abrupt change in the light intensity level for maintaining the proper resolution of the transmitted and reproduced picture. With the quantizing level and sampling frequency selected in the above-mentioned manner, the difference signal of the first delta modulator appearing on lead 103 may include the difference between the original signal on lead 101 and the output of the local decoder 12 when said output on lead 102 cannot faithfully approximate the rapid amplitude change in the original signal on lead 101. The difference signal produced under this condition may be referred to as an error component which is derived while the first delta modulator is not capable of accurately representing the abrupt change in the light intensity level of the applied video signal. The second delta modulator, which may be similar to the delta modulator of FIG. 1, is therefore arranged to delta-modulate this error component, with the quantizing level thereof several times as great as that of the first delta modulator. With regard to the sampling frequency, the second delta modulator may be provided with sampling pulses having a sampling frequency different from that of the first delta modulator, it being recognized that the requirements for adequate resolution of a reproduced picture are satisfied by the selected quantizing level taken with the selected sampling frequency.

Output coded signals on leads 104 and 204 are delivered from the delta modulators to multiplexing circuit 14 and then transmitted as a time division multiplexed serial pulse signal over transmission path 001. The circuit 14 may be composed of a well-known parallel-serial converter conventionally utilized in the multiplexing art. A detailed description of the delta modulation transmitting apparatus may be found in my copending application Ser. No. 847,622, filed on even date herewith.

At the receiving station, pulse trains on leads 105 and 205, corresponding to the outputs of the first and second delta modulators, are separated from the received signal by a separating circuit 16 which may be composed of a well-known serial-parallel converter conventionally utilized in demultiplexing operations. The separated pulse trains are demodulated by respective demodulators 15 and 25 which may be similar to local decoders 12 and 22, respectively. The resultant outputs on leads 106 and 206 are combined by a conventional adder circuit 17 whereby the original signal is reproduced. The demodulators 15 and 25 respectively comprise decoders, including integrating means which may be exactly the same as those of the local decoders 12 and 22 at the transmitting station, and additionally include lowpass filters for deriving only the fundamental frequency component of the original signal provided at terminal *a*.

Figure 3:
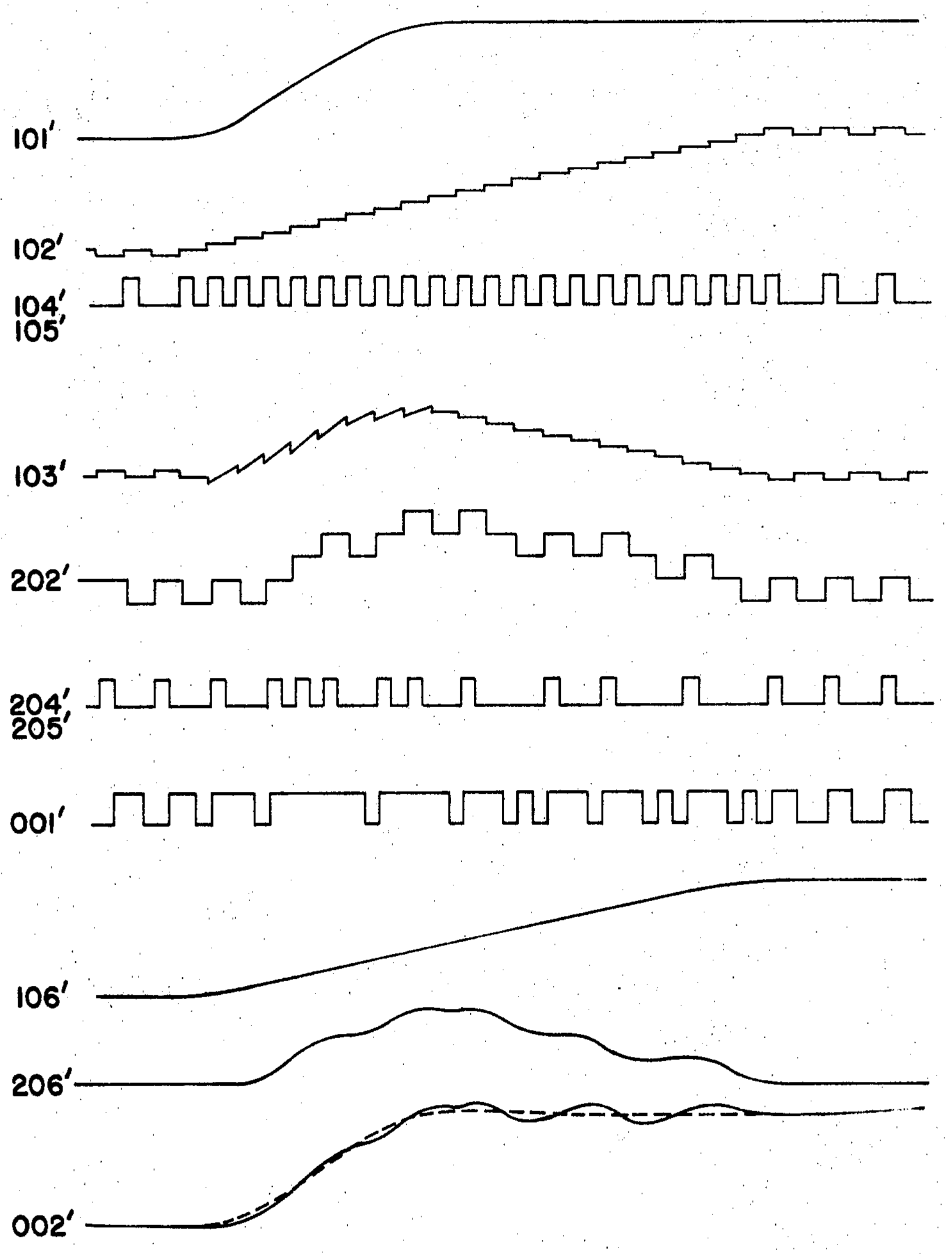
FIG. 3 is a waveform diagram for describing the embodiment of FIG. 2.

In FIG. 3, waveforms representative of the signals produced by the corresponding components of FIG. 2 are shown. For purposes of explanation it is assumed that local decoders 12 and 22 are respectively formed of single integrating circuits, that the sampling frequency of each of the first and second delta modulators are equal, and that the quantizing level of the second delta modulator is four times as great as the quantizing level of the first delta modulator. It is, of course, understood that the local decoders 12 and 22 of each of the delta modulators may comprise other conventional decoding circuits heretofore utilized by the prior art, and the sampling frequency of the sampling pulses applied to the 1-bit polarity coder 11 need not be equal to the sampling frequency of the sampling pulses applied to the 1-bit polarity coder 21. Further, the assumption that the quantizing level of the delta modulator comprised of 1-bit polarity coder 21, local decoder 22 and subtractor 23 is four times as great as the quantizing level of the delta modulator comprised of 1-bit polarity coder 11, local decoder 12 and subtractor 13 implies that the signal applied to subtractor 23 by lead 103 is subject to coarse quantization and the signal applied to subtractor 13 by lead 101 is subject to fine quantization. In other words, the magnitude of the signal produced by local decoder 22 in response to a pulse applied thereto by 1-bit polarity coder 21 is four times as great as the magnitude of the signal produced by local decoder 12 in response to a pulse applied thereto by 1-bit polarity coder 11. Since 1-bit polarity coders 11 and 21 will not generate respective output pulses unless the magnitude of the signal on lead 101 exceeds the magnitude of the signal on lead 102 and the magnitude of the signal on lead 103 exceeds the magnitude of the signal on lead 202, respectively, it is apparent that a slight increase in the amplitude of the signal provided at input terminal *a* will be sufficient to cause 1-bit polarity coder 11 to produce an output pulse, but might be inadequate to induce 1-bit polarity coder 21 to produce an output pulse. An abrupt change in the amplitude of the input signal at input terminal *a* will cause 1-bit polarity coder 11 to produce a pulse and, in addition, will now be capable of inducing 1-bit polarity coder 21 to produce an output pulse. Consequently, the coarse quantization function of the delta modulator comprised of 1-bit polarity coder 21, local decoder 22 and subtractor 23 enables that decoder to indicate relatively large amplitude excursions of an input signal; and the fine quantization function of the delta modulator comprised of 1-bit polarity coder 11, local decoder 12 and subtractor 13 enables this latter decoder to indicate relatively small changes in the amplitude of an input signal. One skilled in the art will recognize that the error signal generated by subtractor 13 is a manifestation of the inherent time delay characteristic of delta modulation and may be advantageously employed as a representation of relatively large amplitude excursions of a signal applied to input terminal *a*. It is preferred to encode this error signal by the delta modulator apparatus shown in FIG. 2 to accurately characterize the abrupt changes of said applied signal.

The waveforms shown in FIG. 3 are identified by the primed reference numerals shown in FIG. 2. The waveform 001′ shows the output of the circuit 14, which is the resultant signal obtained from the time-division-multiplexing of waveforms 104′ and 204′ with first and second time slots arbitrarily assigned to the former and latter waveforms, respectively. Other primed reference numerals in FIG. 3 show the waveforms of like unprimed reference numerals in FIG. 2.

With the above assumption taken into account, the pulse repetition frequency at the transmission line 001 (waveform 001′) is twice as great as the sampling frequency $f_s$ at the first or second delta modulators. Assuming that the quantizing level of the first delta modulator is $\lambda$ and the quantizing level of the second delta modulator is $4\lambda$, then the delta modulator of FIG. 2 is capable of accurately encoding a signal having a slope of $5\lambda f_s$. Prior to the present invention, the encoding of a signal having a slope of $5\lambda f_s$ by a single delta modulator, required a sampling frequency of $5f_s$. From this it follows that band compression may be obtained in accordance with the present invention at the rate of $2f_s/5f_s=2/5$.

As previously described, the visual discrimination by the human eye to the level of light intensity is low when the change in the level of said light intensity is abrupt. It can be seen that the large variation in the difference signal 103′ produced by the first delta modulator corresponds to such portions of abrupt change in light intensity. Since this portion is not visually perceived with a high degree of discrimination it follows that, according to the above-mentioned theory of the sensitivity of the human eye, fine quantization thereof is not required and, therefore, the quantizing step at the second delta modulator may be four times as great as the quantizing step at the first delta modulator. This relatively coarse quantization of the error signal 103′ does not cause any appreciable defects in the reproduced picture, thereby admitting of a band compression ratio of 2/5. As will be seen from the embodiment of FIG. 2, those portions of the video signal which show moderate light intensity level change are quantized at the sufficiently fine quantizing step represented by the waveform 102′, while the large variation in the difference signal 103′, which corresponds to the abrupt change in light intensity level in the video signal, is further delta-modulated at the coarse quantizing step of the second delta modulator. This configuration makes it possible to decrease the sampling frequency without degrading the quality of a reproduced picture even for those portions of a video signal exhibiting moderate change and without producing error signals having a dangerously high magnitude for those portions exhibiting abrupt changes in light intensity.

In the embodiment of FIG. 2, the second delta modulator may be of the same type and have the same sampling frequency as the first delta modulator, with a quantizing step four times as great as the latter. However, it is understood that the second delta modulator may be of a type quite different from the first delta modulator. The sampling frequency may also be different. Also, the local decoder included in the second delta modulator may be a double integrating circuit, instead of a single integrating circuit.

If the sampling frequency at the second delta modulator is distinct from that of the first delta modulator, the so-called NRZ waveform should be employed, in order to facilitate the time-division multiplexing at the combining circuit 14. In the illustrated example of the FIG. 2 embodiment, the output of the first and second delta modulators are interlaced in the well-known manner to form the waveform 001′. This, however, is not readily applicable to those cases where the sampling frequency is different from one delta modulator to another. Accordingly, in those cases, the so-called "retiming" may be necessary prior to combining the output signals.

Furthermore, a filter may be inserted between the output of the subtractor 13 and the input of subtractor 23 of the second delta modulator, with a view to stabilizing the delta modulation at the second delta modulator by removing the sampling frequency component of the error signal.

As will be seen from the description, the second delta modulator may be replaced by a PCM modulator. In this case, the difference signal 103′ of the first delta modulator is sampled at least at a frequency twice as high as the maximum frequency component of the original signal. The difference signal 103′ may be encoded into 3 bits or 4 bits as is conventional in the case of the standard video signal. This PCM-modulated signal is multiplexed at the combining means 14 for transmission. At the receiving station, the PCM-modulated component representative of the abrupt change in light intensity is separated at the separating circuit 16, demodulated by the demodulator 25 and added to the signal output 106′ of the first demodulator. Suitable timing should be established between the signals 106′ and 206′, in accordance with well-known techniques. If necessary, a delay circuit may be employed for compensating for possible time differences unavoidably appearing between the signals 104′ and 204′ in carrying out the delta and PCM modulation, respectively. Similar time difference compensation measures may also be taken at the receiving station to effect a necessary adjustment. This technique may be recognized by those skilled in the art as the so-called retiming.

In the foregoing, the output of the second delta modulator corresponding to error components is assumed to be transmitted along with the output of the first delta modulator after being time-division-multiplexed at the multiplexing circuit 14. The second delta modulator output may be transmitted by conventional frequency division or space division techniques, thereby obviating the necessity of the circuit 14 and separating circuit 16. It is understood that the transmission channels for the first and second delta modulator outputs, respectively, may be of narrower bandwidth than that for the time-division-multiplexed signal. This modification is effective particularly when transmission lines are of so narrow bandwidth that a plurality of transmission lines are needed to accommodate a pulse-modulated video signal.

The principle of this invention has been explained above in detail in connection with one specific embodiment. It is apparent, however, that various modifications may be made within the technical scope of the invention. Further delta modulators or PCM modulators may be employed in addition to the second delta modulator to encode for the above-mentioned error components.

I claim:

1. A band-compressed delta modulated signal communication system for transmitting an information signal admitting of abrupt changes of amplitude, comprising:
- delta modulating means for delta modulating said information signal, said delta modulating means including;
  - first polarity discriminating means adapted to provide a first output pulse signal when an error signal applied to the input of said first polarity discriminating means admits of a first polarity,
  - first integrating means coupled to said first polarity discriminating means for integrating said first output pulse signal to produce a first variable threshold level, and
  - first subtracting means coupled to said first integrating means and adapted to be provided with said information signal, for comparing said information signal with said first variable threshold level to produce said error signal when said information signal exceeds said first variable threshold level,
- pulse modulating means coupled to said subtracting means for providing a pulse modulated signal representative of the amplitude of said error signal;
- transmitting means coupled to said first polarity discriminating means and said pulse modulating means for transmitting said first output pulse signal and said pulse modulated signal;
- receiving means coupled to said transmitting means for receiving said first output pulse signal and said pulse modulated signal; and
- reproducing means coupled to said receiving means for reproducing said information signal in response to said received first output pulse signal and said received pulse modulated signal.

2. A band-compressed delta modulated signal communication system in accordance with claim 1 wherein said transmitting means comprises time-division multiplexing means for combining said first output pulse signal and said pulse modulated signal to form a multiplexed signal.

3. A band-compressed delta modulated signal communication system in accordance with claim 1 wherein said pulse modulating means comprises at least one additional delta modulating means including:
- second polarity discriminating means adapted to provide a second output pulse signal when a difference signal applied to the input of said second polarity discriminating means admits of a first polarity;
- second integrating means coupled to said second polarity discriminating means for integrating said second output pulse signal to produce a second variable threshold level, said second variable threshold level exceeding said first variable threshold level by a desired magnitude; and
- second subtracting means coupled to said second integrating means and adapted to be provided with said error signal for comparing said error signal with said second variable threshold level to produce said difference signal when said error signal exceeds said second variable threshold level.

4. A band-compressed delta modulated signal communication system in accordance with claim 3 wherein said first and second polarity discriminating means are connected to corresponding first and second means for applying first and second sampling signals, respectively thereto, and wherein the frequency of said first sampling signals is equal to the frequency of said second sampling signals.

5. A band-compressed delta modulated signal communication system in accordance with claim 3 wherein said transmitting means comprises multiplexing means for combining said first output pulse signal and said second output pulse signal; and wherein said receiving means comprises signal separating means for recovering said first output pulse signal and said second output pulse signal from said combined signal.

6. A band-compressed delta modulated signal communication system in accordance with claim 5 wherein said reproducing means comprises:

first demodulating means for demodulating said first output pulse signal to derive a first analog signal corresponding to said first output pulse signal;

second demodulating means for demodulating said second output pulse signal to derive a second analog signal corresponding to said second output pulse signal; and combining means coupled to said first and second demodulating means for combining said first and second analog signals whereby said information signal is reproduced.

7. A pulse communication system for transmitting an information signal admitting of abrupt amplitude variations, comprising:

a transmitter including;

first delta modulating means characterized by a first quantizing level, for modulating said information signal to produce a first output pulse signal in response to gradual variations of the amplitude of said information signal, second delta modulating means coupled to said first delta modulating means and characterized by a second quantizing level, for producing a second output pulse signal in response to abrupt variations of the amplitude of said information signal, said second quantizing level being larger than said first quantizing level, transmitting means coupled to said first and second delta modulating means for transmitting said first and second output pulse signals to a remote station, and a receiver including;

receiving means for receiving said first and second output pulse signals, demodulating means coupled to said receiving means for demodulating said first and second output pulse signals whereby first and second analog signals representative of gradual variations in the amplitude of said information signal and abrupt variations in the amplitude of said information signal, respectively, are produced, and combining means coupled to said demodulating means for algebraically combining said first and second analog signals whereby said information signal is reproduced.

8. A pulse communication system in accordance with claim 7 wherein each of said first and second delta modulating means comprises:

1-bit polarity coding means adapted to be provided with sampling pulses for generating an output pulse in response to a signal supplied thereto;

integrating means coupled to said 1-bit polarity coding means for integrating said generated pulse, the magnitude of the output produced by said integrating means being increased by a predetermined increment in response to each generated pulse; whereby the predetermined increment associated with the integrating means of said first delta modulating means corresponds to said first quantizing level and the predetermined increment associated with the integrating means of said second delta modulating means corresponds to said second quantizing level such that the second predetermined increment exceeds the first predetermined increment by a desired amount; and subtracting means having a first input terminal, a second input terminal coupled to said integrating means and an output terminal coupled to said 1-bit polarity coding means for supplying a signal proportional to the difference between an input signal supplied to said first input terminal thereof and the output produced by said integrating means to said 1-bit polarity coding means.

9. A pulse communication system in accordance with claim 8 wherein said first input terminal of the subtracting means of said first delta modulating means is supplied with said information signal and said first input terminal of the subtracting means of said second delta modulating means is coupled to said output terminal of the subtracting means of said first delta modulating means.

10. A pulse communication system in accordance with claim 9 wherein said demodulating means comprises:

first means for integrating said first output pulse signal to produce said first analog signal, the magnitude of said first analog signal being increased by a first given amount in response to each pulse of said received first output pulse signal; and second means for integrating said second output pulse signal to produce said second analog signal, the magnitude of said second analog signal being increased by a second given amount in response to each pulse of said received second output pulse signal, whereby said second given amount exceeds said first given amount.

11. A pulse communication system in accordance with claim 10 wherein said combining means comprises algebraic adding means.

12. A video signal communication system for transmitting a wide-band video signal representative of variations in light intensity, comprising:

a first delta modulator operable at a first frequency and at a first quantizing level for producing a first output pulse signal in response to gradual variations in said light intensity that exceed an amount determined by said first quantizing level;

a second delta modulator coupled to said first delta modulator, said second delta modulator being operable at a second frequency and at a second quantizing level for producing a second output pulse signal in response to abrupt variations in said light intensity that exceed an amount determined by said second quantizing level; whereby the sum of the product of said first frequency and said first quantizing level and the product of said second frequency and said second quantizing level is equal to the maximum slope of said video signal;

means for supplying said video signal to said first delta modulator;

transmitting means coupled to said first and second delta modulators to transmit said first and second output pulse signals;

receiving means for receiving said first and second output pulse signals;

demodulating means coupled to said receiving means for demodulating said first and second output pulse signals; and combining means coupled to said demodulating means for reproducing said video signal in accordance with the demodulated signals.

13. A video signal communication system in accordance with claim 12 wherein each of said first and second delta modulators comprises:

coding means adapted to be provided with sampling pulses for generating an output pulse in response to a signal applied thereto;

integrating means coupled to said coding means for integrating said generated pulses to produce an integrated signal, the magnitude of said integrated signal being increased by a predetermined amount in response to each generated pulse; whereby the predetermined amount associated with the integrating means of said first delta modulator corresponds to said first quantizing level and the predetermined amount associated with the integrating means of said second delta modulator corresponds to said second quantizing level;

subtracting means coupled to said integrating means and adapted to be supplied with an input signal for producing a difference signal proportional to the difference between said supplied signal and said integrated signal; and means for applying the difference signal to said coding means.

14. A video signal communication system in accordance with claim 13 further comprising means for supplying the difference signal produced by the subtracting means of said first delta modulator to the subtracting means of said second delta modulator.

15. A video signal communication system in accordance with claim 14 wherein the frequency of the sampling pulses provided to the coding means of said first delta modulator corresponds to said first frequency and the frequency of the sampling pulses provided to the coding means of said second delta modulator corresponds to said second frequency, and wherein said first frequency is equal to said second frequency.